United States Patent [19]
Jacobs

[11] 4,151,954
[45] May 1, 1979

[54] HEAT REGULATING SYSTEM AND METHOD FOR A BUILDING INVOLVING CONTROL OF INCIDENT SOLAR RADIATION

[76] Inventor: J. Ethan Jacobs, 120 Church Rd., Winnetka, Ill. 60093

[21] Appl. No.: 647,600

[22] Filed: Jan. 8, 1976

[51] Int. Cl.² .............................................. F24J 3/02
[52] U.S. Cl. .................................. 237/1 A; 126/270; 98/31
[58] Field of Search ....................... 126/270; 237/1 A; 52/302; 98/31

[56] References Cited

U.S. PATENT DOCUMENTS

| | | | |
|---|---|---|---|
| 1,467,005 | 9/1923 | Lawrence | 98/31 X |
| 1,957,279 | 5/1934 | Linke | 126/270 X |
| 2,931,578 | 4/1960 | Thompson | 237/1 A |
| 3,288,206 | 11/1966 | Beeler | 165/39 |
| 3,424,233 | 1/1969 | Meckler | 98/40 DL X |
| 3,863,621 | 2/1975 | Schoenfelder | 237/1 A X |
| 3,935,898 | 2/1976 | Westergren | 165/22 |
| 3,946,721 | 3/1976 | Keyes et al. | 126/270 |
| 3,990,635 | 11/1976 | Restle et al. | 237/1 A |

OTHER PUBLICATIONS

Solar Energy, vol. 17, No, 3, Jul. 1975, pp. 159-165, Fuschillo, N., "Semi-Transparent Solar Collector Window Systems".

Primary Examiner—William E. Wayner
Assistant Examiner—William E. Tapolcai, Jr.
Attorney, Agent, or Firm—Haight, Hofeldt, Davis & Jambor

[57] ABSTRACT

A more even distribution of heat in a building is achieved by preventing incident solar radiation from unequally heating the building. The heat component of incident solar radiation is entrapped and conveyed to other portions of the building requiring heat. In warm weather the entrapped heat may be vented to the atmosphere. One form of the invention involves the use of two spaced panes of glass for a window, with the heat component of the incident solar radiation being entrapped in the chamber between the panes and then conveyed either to other parts of the building or to the atmosphere.

8 Claims, 3 Drawing Figures

U.S. Patent   May 1, 1979   4,151,954
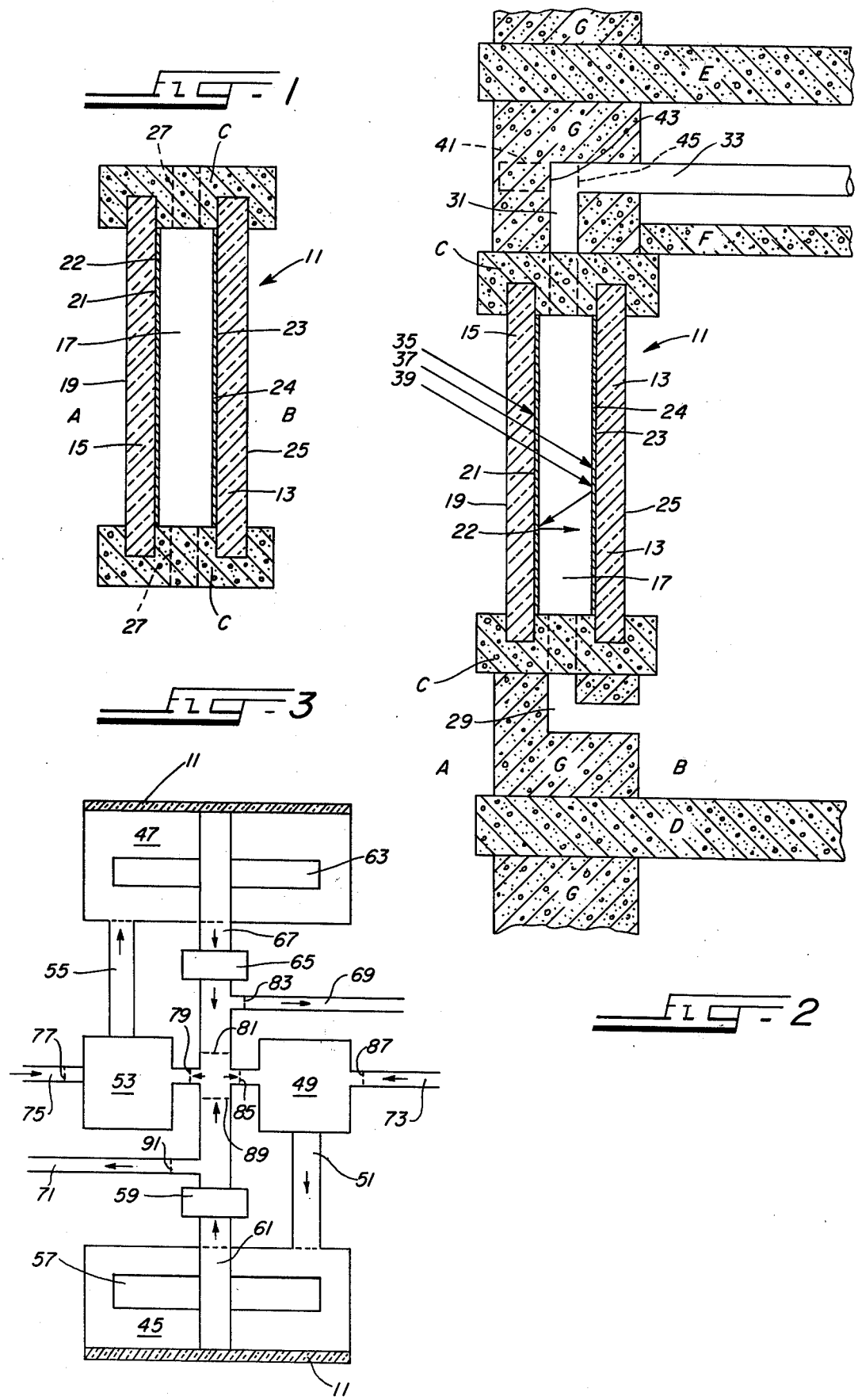

HEAT REGULATING SYSTEM AND METHOD FOR A BUILDING INVOLVING CONTROL OF INCIDENT SOLAR RADIATION

BACKGROUND OF THE INVENTION

1. Field of the Invention

The present invention relates generally to the correction of heat imbalances of a building resulting from the effects of incident solar radiation, and more particularly, this invention relates to a system and method for entrapping the heat component of incident solar radiation and either distributing it to other portions of the building or returning it to the atmosphere.

2. Description of the Prior Art

Wall units, particularly windows, exposed to incident solar radiation are known to present difficulties in the heating and air conditioning of buildings. These difficulties vary with the seasons, with the weather, and with the spatial orientation of the wall unit or window in question. For instance, in both hot and cold weather the heat from incident solar radiation causes imbalances, sometimes quite severe, in the air conditioning and heating of the building, which either requires separate units or separate control of a master unit. Even so, a uniform temperature can not be achieved over the entire gradation of solar energy heating effects on the building without excessive expense.

During the summer, the solar radiation incident on building walls and windows causes a heat gain in the adjacent interior areas, thus increasing the burden on the cooling system of the building. During the winter, the heat gain from such incident solar radiation can relieve some of the burden on the heating system of the building, but on clear days the walls and windows exposed to incident solar radiation allow substantial amounts of excess heat energy to enter the adjacent areas, while other areas in the same building (not adjacent to wall units exposed to incident solar radiation) receive insufficient heat energy. The disproportionate heat gain from this source places undue burdens on the heating, ventilating and air conditioning system of the building, for it requires that such system supply cooling to the former areas at the same time that it supplies heating to the latter areas.

At least one system (that illustrated in U.S. Pat. No. 3,590,913 — Tschudin) attempts to deal with the ultimate problem of air conditioning the interior areas by constructing wall units of parallel glass panels separated by a cavity through which a light-transmitting heating or cooling medium can be circulated. This system is inordinately expensive and inefficient because: (1) it allows the ambient outside environment to withdraw from (or add to) the heating (or cooling) medium as much or more heat energy than the adjacent indoor environment is able to withdraw (or add); and (2) it fails to utilize the incident energy which otherwise would result in the undesirable heat gain.

Some wall units, particularly windows, are designed with outside surfaces which reflect incident solar radiation to reduce the heat gain in the adjacent interior areas. These wall units are inefficient in that the incident solar radiation is reflected back to the ambient atmosphere and not utilized. This is particularly wasteful in the winter months when the mid-day sun, being low in the sky, causes more than average amounts of incident radiation to strike the vertical walls exposed to the south and west, while at the same time the winter temperatures cause greater than average heat loss from all walls, particularly those exposed to the north and east.

It is possible to avoid this inefficiency by constructing the wall unit or window in such a way that the reflective surface can be removed when conditions dictate that the solar radiation be allowed to enter and add heat to the adjacent interior area. An arrangement described by Nicholas Fuschillo in an article entitled "Semi-Transparent Solar Collection Window System", *Solar Energy*, Vol. 17, pp. 159–165 (1975), avoids this manual operation by erecting a second, transparent panel outside of the reflective surface and providing valves to allow venting the heat from the area between the panels either to the outside (during hot weather) or to the adjacent interior area (during cold weather). Neither of these types of systems, however, deals with the problems of differential heating of interior areas adjacent to wall units or windows exposed to incident solar radiation and interior areas adjacent to wall units or windows not exposed to incident solar radiation.

SUMMARY OF THE INVENTION

The differential heating problems encountered in heating or air conditioning a building are considerably alleviated by the invention disclosed herein. In the present invention a window or other wall unit is composed of two spaced parallel panels forming a cavity or chamber therebetween. The exterior panel (adjacent to the ambient atmosphere) is designed to transmit solar heat radiation. The exterior surface of the exterior panel (adjacent to the ambient atmosphere) may, but need not, be specially treated. The interior surface of the exterior panel (adjacent to the chamber) is treated in a manner to absorb solar heat radiation.

The interior panel (adjacent to the interior building area) is designed not to transmit solar heat radiation. The exterior surface of the interior panel (adjacent to the chamber) is treated in a manner to reflect solar heat radiation, or to absorb such radiation, or to partially reflect and partially absorb such radiation. The interior surface of the interior panel (adjacent to the interior building area) may, but need not, be specially treated.

Solar heat radiation incident on the window or other wall unit is blocked from entering the adjacent interior area of the building and is absorbed by the surfaces of the panels, which surfaces form the vertical side boundaries of the chamber. Since the radiant energy is absorbed by such surfaces, their temperature rises and the heat is transferred by conduction to the air occupying the chamber, thus increasing its temperature as well.

The chamber is sealed, but provision is made for free air to selectively enter the chamber from the adjacent interior building area. Further provision is made to selectively withdraw the heated air entrapped in the chamber and to transport it elsewhere, where its increased heat energy content may be utilized or transferred to the atmosphere, depending upon the season. Because the heated air is constantly being withdrawn, the temperature of the surfaces of the panels forming the chamber rise only moderately. This reduces the amount of heat transmitted through the interior panel by conduction and further increases the efficiency of the system for reducing the cooling burden on the adjacent interior areas.

One way to provide for such free air to enter and heated air to be withdrawn from the cavity is to seal the side edges of the chamber, provide free air access to the bottom of the chamber and withdraw the heated air from the top of the chamber to the existing ductwork of the building ventilating system. Modern building design already provides for the ceiling ventilation system to withdraw air from those building areas where the number of lights, people, or other factors create excess heat and to utilize the heat in such air for the purposes of preheating incoming fresh air, heating water for the restroom facilities and for other purposes. Since current building design already provides for utilization of excess heat generated by lights, people, machinery, etc., the full potential of the present invention readily can be realized by connecting the chamber through a short duct to the existing heated air exhaust system, which is already equipped to utilize heat energy such as that obtained by the invention from the incident solar radiation.

By use of the present invention, it is possible to prevent excess heat build-up or reduce the cooling burden on interior areas adjacent to walls exposed to incident solar heat radiation by intercepting and entrapping that radiation before it enters such interior areas. The entrapped heat energy in such incident solar heat radiation may then be discarded or made available for use in heating those areas of the building receiving insufficient solar heat radiation or for use in other ways. Further, the present invention is accomplished in a manner compatible with current wall and window architectural design and with current heating, ventilating, and air conditioning design. Hence, the present invention reduces the cooling burden on those areas of the building receiving excess incident solar heat, reduces the heating burden on those areas of the building receiving insufficient incident solar heat, and achieves both these results with only minor additions to the building's system of ventilating duct work.

Although the present invention is of a general nature relating to wall units, it is of particular utility when utilized in a wall unit transparent or semi-transparent to electromagnetic waves in the visible spectrum and designed to function as a window. The preferred embodiment disclosed herein will be described as a window unit, but the invention is not restricted to use in the window format.

These and other objects, advantages and features of this invention will hereinafter appear, and for purposes of illustration, but not of limitation, exemplary embodiments of the subject invention are shown in the appended drawing.

BRIEF DESCRIPTION OF THE DRAWING

FIG. 1 is a cross-sectional view of a wall unit constructed in accordance with the present invention.

FIG. 2 is a vertical cross-sectional view of the wall unit of FIG. 1 utilized as a window unit in a building.

FIG. 3 is a schematic plan view of the present invention utilized in conjunction with a heating, ventilating and cooling system of a building or buildings.

DETAILED DESCRIPTION OF THE PREFERRED EMBODIMENTS

In FIG. 1 a wall unit 11 is illustrated. Wall unit 11 includes two panels 13 and 15 positioned substantially parallel to one another. While the panels 13 and 15 may be any appropriate wall panels, for this preferred embodiment they will be referred to as panes of glass utilized to provide a window unit for a building.

Panes 13 and 15 are secured in the substantially parallel position by a supporting structure C. Supporting structure C is any appropriate type of mounting arrangement, such as a window frame which encloses the edges of the area between window panes 13 and 15 to form a chamber 17. The window unit 11 thus constructed is utilized as part or all of the exterior wall of a building to separate the outside ambient atmosphere A from an adjacent interior area B.

The exterior wall panel 15 is designed to transmit solar radiation, which includes solar heat radiation (primarily electromagentic radiation in the infra-red spectrum), such as glass when a pane of a window unit. The exterior surface 19 of window pane 15 need not be specially treated. However, to increase the relative efficiency of the insulating properties of the invention (while suffering a decrease in the relative efficiency of the heat energy collecting properties of the invention), surface 19 could be designed to reflect solar heat radiation, for example, by the application of a thin film of chromium, gold, copper, alloy or other suitable metal. The interior surface 21 of pane 15 is designed to absorb solar heat radiation, for example, by the application of a thin film 22 (shown in exaggerated form for purposes of illustration) of a dark metallic oxide, such as chromic oxide ($Cr_2O_3$) or cuprous oxide ($Cu_2O$).

The interior wall panel 13 is designed not to transmit solar heat radiation. For example, it might be constructed of metal, wood or plastic. If the wall unit is to function as a window, wall panel 13 would be a pane of glass. The exterior surface 23 of window pane 13 is designed to reflect, to absorb or partially to reflect and partially to absorb solar heat radiation, for example, by the application of a thin film 24 (shown in exaggerated form for purposes of illustration) using materials as described in the preceeding paragraph. The interior surface 25 of window pane 13 need not be specially treated. To increase the relative efficiency of the invention as an insulator, surface 25 may be designed to reflect heat radiation, for example, by the application of thin films such as described in the preceeding paragraph.

If the wall unit 11 is to function as a window, panels 13 and 15, surfaces 19, 21, 23 and 25 and films 22 and 24 must be designed to transmit at least some electromagnetic radiation in the visible spectrum. The use of glass panes for panels 13 and 15 and the use of films of metals and metal oxides as described above in thicknesses of a few hundred angstroms will permit transmission of substantial portions of the incident visible light. The materials to be utilized in such films may be varied or used in differing combinations to achieve desirable architectual effects by passing more or less visible light of various colors.

When solar heat radiation is incident on window unit 11 so constructed, it passes through pane 15 and film 22. Much of the heat radiation is absorbed by film 22, but some passes through chamber 17 and is incident on surface 23. Some of the heat radiation incident on surface 23, is absorbed by film 24, some is reflected, and some small amount is transmitted through film 24 and surface 23 into pane 13.

This small amount of heat radiation will pass through window pane 13 and into the adjacent interior area B. If panel 13 is constructed of wood, metal, plastic or a similar material not transparent to heat radiation, this small amount of heat radiation will be absorbed by panel 13 and some even smaller amount will be transmitted by conduction into the adjacent interior area B.

The heat radiation reflected from film 24 on surface 23 passes back through chamber 17 and impinges upon surface 21. Most of this heat radiation is absorbed by film 22, but some small amount passes on out through window pane 15 and is lost in the ambient atmosphere.

The radiant energy absorbed by films 22 and 24 on surfaces 21 and 23 increases the temperature at such surfaces and the heat is transmitted to the air in chamber 17 by conduction. Passages 27 are provided in supporting structure C so that unheated air from the outside atmosphere A or the adjacent interior area B may be drawn into chamber 17 and so that the heated air in chamber 17 may be withdrawn and discarded or its increased heat energy content utilized elsewhere.

Withdrawing the heated air from chamber 17 tends to cool the surfaces 21 and 23 and hence decreases the rate at which heat is conducted from film 24 on surface 23 through pane 13 and into the adjacent interior area B. Hence, it further increases the efficiency of the invention by insulating the adjacent interior area B from excess heat build-up resulting from the incident solar energy.

FIG. 2 shows a typical installation of window unit 11 in a building. Supporting structure C is located in an exterior wall G of the building between a floor D and a floor E of the building. As described in connection with FIG. 1, the window unit 11 separates the outside ambient atmosphere A from the adjacent interior area B.

A duct 29 is provided to insert unheated air into chamber 17 from near the floor D of adjacent interior area B. A duct 31 is provided to withdraw the heated air from chamber 17 and transport it through the building ductwork 33 between the top of a ceiling F and the bottom of the floor E above the adjacent interior area B.

Arrows 35, 37 and 39 represent solar energy striking window pane 15. Arrow 35 represents solar heat energy incident on pane 15 which is transmitted through pane 15, absorbed by film 22 on surface 21, and the conducted into the air in chamber 17. Arrow 37 represents solar heat energy incident on pane 15 which is transmitted through pane 15, surface 21, film 22 and chamber 17; absorbed by film 24 on surface 23 and then conducted into the air in chamber 17. Arrow 39 represents solar heat energy incident on pane 15 which is transmitted through pane 15, film 22 on surface 21, and chamber 17; reflected by film 24 on surface 23; transmitted back through chamber 17; absorbed by film 22 on surface 21; and then conducted into the air in chamber 17. Of course, in practice a certain amount of solar heat radiation will pass through window pane 13 into the adjacent area B, as a result of the necessity of insuring that as much of the solar visual light radiation be transmitted to the area B. However, by proper choice of the films 22 and 24, visual light transmission may be maximized and heat radiation minimized.

Unheated air entering chamber 17 from the adjacent interior area B through duct 29 is heated in chamber 17 and transported through ducts 31 and 33 to another area where its increased heat energy may be used in space heating, water heating, or in other manners. If it is just desired to discard this heat energy, another duct, shown schematically at 41, may be provided to appropriately vent the heated air to atmosphere A. Of course, the duct 33 would have to be closed when the heated air is passed to duct 41, and vice versa, so appropriate control panels are schematically illustrated at 43 and 45.

FIG. 3 is a schematic plan of a typical utilization of the present invention in a building heating, ventilating, and cooling system of conventional design. Spaces 45 and 47 are different areas of a building (or of different buildings). A heating and cooling unit 49 supplies conditioned air (heated or cooled) through duct 51 to area 45. A similar heating and cooling unit 53 supplies conditioned air through duct 55 to area 47.

A ceiling light fixture 57 is shown in area 45. A window unit 11 constructed in accordance with the present invention is installed in an exterior wall of each of the areas 45 and 47. A fan 59 extracts heated air from light fixture 57 through duct 61. Duct 61 has been extended and connected to the window unit 11 of the present invention to withdraw heated air from the chamber 17 therein.

A similar ceiling light fixture 63 is provided in area 47. A fan 65 extracts heated air from light fixture 63 through a duct 67. Duct 67 has been extended and connected to the window unit 11 of the present invention in area 47 to withdraw heated air from the chamber 17 therein.

A duct 69 is provided to permit fan 65 to exhaust heated air to the outside, and a similar duct 71, through which fan 59 may exhaust heated air to the outside, is provided. A duct 73, through which unit 49 may draw fresh air from the outside, extends from unit 49. A similar duct 75 extends from unit 53 to draw fresh air from the outside.

A series of dampers are schematically shown at 77, 79, 81, 83, 85, 87, 89 and 91. These dampers are utilized to control the flow of air through the various ducts of the system. Additional dampers may be employed (e.g., in the extension of ducts 61 and 67) if required.

During the typical summer months, the heat gain from the lights and exterior walls places a burden on the cooling capacities of units 49 and 53. Dampers 81 and 89 are then closed and dampers 83 and 91 are opened, so that the fans 59 and 65 may extract the heated air from light fixtures 57 and 63 and exhaust it outside through ducts 69 and 71, where its heat is dissipated in the atmosphere, or where its heat energy may be extracted from some useful purpose. Since ducts 61 and 67 have been extended and connected to window units 11, the heat energy which window units 11 prevented from entering areas 45 and 47 is also exhausted (or utilized elsewhere) and the cooling burden on units 49 and 53 is further reduced.

In the typical winter months when the sun, lying low in the sky, shines most strongly on the vertical walls with southern exposures and not at all on the vertical walls with northern exposures, without the present invention there would be a disproportionate solar heat gain in an area having a southern exposure over that in an area having a northern exposure. If the atmosphere is clear, this can even lead to a situation where one unit (e.g., 49) supplies cooled air to area 45, while another unit (e.g., 53) supplies heated air to area 47.

With the present invention, this waste of energy resources is easily eliminated as follows. Dampers 83, 85 and 91 are closed. Dampers 79, 81 and 89 are opened. Assuming that area 45 has a southern exposure and area 47 has a northern exposure, the heat trapped by window unit 11 in area 45, with its southern exposure, is prevented from overheating area 45 and the heated air in that unit 11 is forced by fan 59 to join the heated air from fixtures 57 and 63. This heated air enters unit 53, where it is used to preheat the cold, fresh air from duct 75 before unit 53 heats such air and sends it through duct 55 to heat the cool interior area 47.

It should be understood that various modifications, changes and variations may be made in the arrangements, operations and details of construction of the elements disclosed herein without departing from the spirit and scope of this invention.

I claim:

1. A heat regulating system to compensate for heating and air conditioning imbalances in a building resulting from the effects of incident solar radiation and comprising:
   a first wall panel adapted to pass incident radiation in the visible spectrum and located in an external wall of the building;
   a second wall panel adapted to pass incident radiation in the visible spectrum and positioned inwardly from said first wall panel to form a chamber therebetween;
   heat trapping means to prevent a large portion of the heat of the incident solar radiation striking said first wall panel from reaching an adjacent interior area of the building and to conserve said portion of the heat in said chamber without obstructing the view of a person in the building; and
   heat transporting means to convey heat from said chamber to another area requiring heat input.

2. A heat regulating system as claimed in claim 1 wherein:
   said first wall panel is a first glass panel;
   said second wall panel is a second glass pane spaced inwardly from said first glass pane to form said chamber therebetween; and
   thin films of material are formed on the surfaces of said glass panes adjacent said chamber to reflect and absorb the heat from the incident solar radiation.

3. A heat regulating system as claimed in claim 2 and further comprising venting means to convey heat from said chamber to the atmosphere when the heat is not required in another area.

4. A heat regulating system to compensate for heating and air conditioning imbalances in a building resulting from the effects of incident solar radiation and comprising:
   a first wall panel adapted to pass incident radiation in the visible spectrum and located in an external wall of the building;
   a second wall panel adapted to pass incident radiation in the visible spectrum and positioned inwardly from said first wall panel to form a chamber therebetween;
   heat trapping means to prevent a large portion of the heat of the incident solar radiation striking said first wall panel from reaching an adjacent interior area of the building and to conserve said portion of the heat in said chamber without obstructing the view of a person in the building; and
   heat transporting means to convey heat from said chamber to another area requiring heat input; and
   venting means to convey heat from said chamber to the atmosphere when heat is not required in another area.

5. A heat regulating system to compensate for heating and air conditioning imbalances in a building resulting from the effects of incident solar radiation and comprising:
   a first pane of glass in an external wall of the building through which incident solar radiation passes;
   a second pane of glass spaced inwardly from said first pane and substantially parallel thereto to form a chamber therebetween;
   a first layer of heat reflecting and absorbing material located on the surface of said second pane adjacent said chamber;
   a second layer of heat reflecting and absorbing material located on the surface of said first pane adjacent said chamber, said first and second layers reflecting and absorbing a maximum amount of the heat component of the incident solar radiation while producing a minimal effect on the visual light component of the incident solar radiation;
   a blower arrangement to transfer air heated in said chamber to other portions of the building requiring heating; and
   a venting arrangement to convey air heated in said chamber to the atmosphere to reduce undesired heating of the building by incident solar radiation.

6. A heat regulating system as claimed in claim 6 wherein said blower arrangement is a fan associated with a lighting fixture from which the heat is transferred to an area requiring heat input, said fan being connected to said chamber by an appropriate duct.

7. A method of compensating for heating and air conditioning imbalances resulting from the effects of incident solar radiation on a building comprising:
   forming a chamber between panels adapted to pass incident radiation in the visible spectrum;
   entrapping a large porting of the heat component of the incident solar radiation in the chamber, without obstructing the view of a person in the building, before it reaches adjacent internal areas of the building;
   conveying the heat entrapped in the chamber to other areas where heat input is required; and
   exhausting the heat entrapped in the chamber to the atmosphere if heat input is not required in other areas.

8. A method as claimed in claim 7 wherein said conveying and exhausting steps comprise utilization of an air transfer system associated with the distribution of heat from a lighting fixture in the building.

* * * * *